United States Patent
Kraenert et al.

[11] Patent Number: 6,002,505
[45] Date of Patent: Dec. 14, 1999

[54] DEVICE FOR IMAGE PROJECTION

[75] Inventors: Juergen Kraenert, Jena; Christhard Deter, Gera; Wolfgang Vogel, Jena; Martin Enenkel, Huettlingen, all of Germany

[73] Assignee: LDT GmbH & Co. Laser-Display-Technologie KG, Gera, Germany

[21] Appl. No.: 09/077,413
[22] PCT Filed: Sep. 6, 1997
[86] PCT No.: PCT/EP97/04834
  § 371 Date: May 28, 1998
  § 102(e) Date: May 28, 1998
[87] PCT Pub. No.: WO98/15127
  PCT Pub. Date: Apr. 9, 1998

[30] Foreign Application Priority Data

Sep. 30, 1996 [DE] Germany .................. 196 40 404

[51] Int. Cl.⁶ .................................................. G02B 26/08
[52] U.S. Cl. .......................... 359/196; 250/221; 359/201; 359/202
[58] Field of Search .................................. 359/196–226; 353/50, 66, 77, 79, 81, 98, 122; 348/744, 764, 818, 819; 250/206, 221, 222.1

[56] References Cited

FOREIGN PATENT DOCUMENTS

WO 95/03676  2/1995  WIPO .

Primary Examiner—James Phan
Attorney, Agent, or Firm—McAulay Nissen Goldberg Kiel & Hand, LLP

[57] ABSTRACT

In an arrangement for displaying images on a projection screen, which arrangement includes a laser, which emits a laser beam, and a deflecting device, which is provided for deflecting the laser beam, and an image-generating device which is connected to a controlling device for controlling the laser and the deflecting means. The image-generating device is switchable in two operating modes, the first operating mode being the standard operating mode for projecting, and the second being an operating mode in which the laser radiation is harmless to a person disposed in the region to which the laser has access. In this regard, a safety circuit is provided and comprises at least one sensor, by which a monitored region, which is larger than the region accessible to the laser, between the image-generating means and the projection screen is monitored as to the presence of objects, wherein the image-generating means is switchable into the second operating mode by means of the safety circuit, in the event of an object being present.

21 Claims, 9 Drawing Sheets

DEVICE FOR IMAGE PROJECTION

BACKGROUND OF THE INVENTION a) Field of the Invention

The invention relates to an arrangement for displaying images on a projection screen, which arrangement includes a laser, which emits a laser beam, and a deflecting means, which is provided for deflecting the laser beam, and an image-generating means which is connected to a controlling device for controlling the laser and the deflecting means.

b) Description of the Related Art

Image-generating means are increasingly used for light effects in show business for entertainment and information, not only within enclosed spaces, but also in the open. In addition, a laser television apparatus, in which lasers are also used to generate images, is being developed.

In these fields of application, in which the effective radiation of the lasers is within the visible region of the spectrum and in which several watts of medium power is required, the spatial region to which the laser has access is detrimental to the health of human beings. This is particularly true in the case of vertical projection, where persons may be located between the image-generating means and a projection screen. Persons are at risk if they happen to come into the immediate range accessible to the projecting laser. It is possible for this risk to be extremely high when the laser used for the projection is directed immediately at a person, owing to interference with the projector, e.g. when the deflecting means stalls.

Yet safety risks cannot be ruled out even in the case of back projections, during which the viewers are generally separated from the laser apparatus by means of a projection screen, even if the entire laser projection system were to be located in a closed housing. For example, a service technician is required to open the housing and to observe the image, in order to adjust it. In so doing, it is possible that parts of his body may fall within the range accessible to the laser.

For lasers used in shows in which the public may happen to enter into that area which is swept by the laser, standards for precautionary means are being prepared in a number of countries. In this regard, the proposed standards are, however, no more than simple contrivances, such as providing a key-operated switch for opening a housing, or an emergency switch. In addition, there are regulations to the effect that lasers shows are to be controlled such that no laser beam will unintentionally fall into the auditorium. The risks to which the public is exposed remain very high, even if these regulations are adhered to, such that it is desirable to provide for increased safety in respect of the arrangement as set out above.

Safety devices are, however, known from other technical fields. Thus, U.S. Pat. No. 5 221 977 proposes, by using spectrum-selective means, to screen off only certain wave lengths and, instead, use holographic elements. The disadvantage in this regard is that information is filtered out at these wavelengths which, in an image-generating means of the type mentioned, is actually intended to reach the eye of the viewer.

Other safety devices include means for switching off the laser, or for reducing the light output power, when no defined reflection is noted in that region into which the laser is directed. Safety devices of this kind are described, for example in DE 33 40 427 A1 and in WO 94 28 972. In particular, the latter printed document describes a device in which a laser is designed to be switched on only when that part of the body, which is to be exposed to the laser for medical purposes, screens the laser from the other parts of the body. Thus, the laser is switched on only when, for example, a finger to be exposed covers an outlet opening for the laser burst.

It is not possible to use safety systems of this kind in arrangements for image generation according to the state of the art as set out above, since here the laser beams must remain visible to the spectators. As stated above, experts on standardization committees make no mention of any means whereby it would be possible to prevent persons from accidentally entering into the hazardous area swept by the laser.

OBJECT AND SUMMARY OF THE INVENTION

The primary object underlying the invention is to provide an arrangement of the kind mentioned at the outset, which meets high requirements regarding the protection of persons in the danger area of a projection laser beam used for image generating.

On the basis of the generic prior art, this object is met in that the image-generating means is switchable in two operating modes, the first operating mode being the standard operating mode for projecting, and the second being an operating mode in which the laser radiation is harmless to a person disposed in the area to which the laser has access, and in that a safety circuit is provided and comprises at least one sensor, by means of which a monitored area, which is larger than the area accessible to the laser, between the image-generating means and the projection screen is monitored as to the presence of objects, wherein the image-generating means is switchable into the second operating mode by means of the safety circuit, in the event of an object being present.

As a result of this feature, it is now possible to provide a very high safety standard for television projection systems using lasers. In this regard, however, a method is used which is precisely the opposite of that used in the above-described medical lasers. In said medical lasers, the apparatus was operated in a danger-free manner when no object was detected, for example by a sensor. In contrast, the sensor according to the invention serves to switch the laser into a safe operating mode when a person is disposed in the monitored area. In so doing, the invention differs substantially from the state of the art.

In the simplest case, it is possible for the switchover into the above-mentioned second operating mode, in which the laser does not pose a danger to persons, to be a switching-off of the projection laser. Since the deflecting means is also controllable via the image-generating means, it is, however, possible for the laser to be blanked in the second operating mode only when it is guided by the deflecting means into that area in which the person to be protected is located. This feature makes it possible, for example for servicing work, for the image to be observed during possible adjusting operations, despite the apparatus being open, and this image is blanked only in regions in which a body part enters the area which is accessible to the laser. In so doing, the service technician will perceive the body part as being a shadow in the image, thereby being warned to proceed with greater care.

According to the invention, it is ensured that any object, say a person, located in the monitored space between the image-generating means and the projection screen, or entering into said space, is automatically perceived by the sensors, as a result of its own electromagnetic radiation or an electromagnetic radiation reflected thereby, or as a result of an acoustic signal emitted by said object. In that case, the sensors permit an immediate influencing of the laser via the image-generating means, such that any danger to the object concerned is effectively ruled out. This is ensured, for example, by the fact that the laser output is switched to zero or into the eye-safe range within a mere few milliseconds. The resultant short switching time is a considerable advantage in comparison to emergency switches or safety circuits as recommended by standardizing authorities. In the last-mentioned devices, allowance must be made for switching times of up to a few seconds, for example when it is necessary for an emergency switch to be actuated, owing to the reaction time required by a person operating the switch. Nonetheless, the risks are particularly high in high-capacity lasers, even when they are switched off.

This risk is greatly reduced as a result of the short switching-off times which are made possible by the invention.

A further advantage of the invention resides in that the highest safety standards are met by the laser radiation, without restricting the transmission of the information content. Further advantages are provided in that, for example before commencing the projection, it is possible, by means of the signals received by the sensors, to detect the uniformity of the projection screen and to prevent any undesirable reflection on to persons caused by non-uniformities or upwardly reflecting objects.

It is planned for the standard specification to draw attention to the fact that, when safeguarding show lasers, care should be taken that, in the area accessible to the laser, there are no reflecting objects which could cause undesirable reflections of laser beams into certain areas. According to the invention, however, even a reflecting object would be detected, since the sensors are generally designed to detect objects. It is thus possible to prevent undesirable reflections. In particular, it is also possible for the sensor information to be used in this regard such that the projection laser beam is monitored in a manner such that it impinges only on the projection screen and is thus restricted in its spatial expansion.

In a preferred further development of the invention, the monitored region comprises the region which is accessible to the laser and an edge region which is provided for the timeous detection of objects which are moving toward the dangerous region.

As described above, a short switch-off time is extremely important in order to reduce dangers to a minimum. As a result of the fact that it is possible for an object, when moving toward the region accessible to the laser, to be detected at an early stage, because of this further development, it is possible for the laser to be switched into the laser-safe region within a time interval prior to the laser impinging on the person disposed in the region accessible to the laser. The laser is then switched off sufficiently rapidly, such that the person entering the region accessible to the laser is not affected.

In a preferred design according to a further development of the invention, the edge region is determined in each deflection direction of the laser, as provided by the deflecting means, as a factor depending on the detection process, the reaction times, the image size and the approaching speed of objects. A size of 10% has proved to be advantageous, in particular in the field of television projection. The shortest time within which it is possible for a laser beam to impinge accidentally on a person entering the monitored region, is the line time which is dependent on the standard image. At a value of about 10%, a correspondingly long time is available for switching off the laser, and this time is quite sufficient for blanking the laser in an arrangement of the generic type, or to attenuate the intensity such that there will be no danger, because this time interval is considerably longer than the required switching time of the laser, which is determined by the time per image element which must be complied with according to the usual TV standards.

In the simplest case, it is possible for the sensors to be mechanical switches which are actuated when persons enter into the danger region, for example by their own mass. At a number of milliseconds, the switching time of such switches is, however, very long. In addition, mechanical switches are susceptible to failure and constitute a substantial outlay. In particular when an arrangement for displaying images, as described at the outset, is to be incorporated in an existing cinema, a very high capital outlay is involved for the plurality of switches which will then be required. It is for this reason that a preferred further development of the invention provides that the at least one sensor is a sensor for detecting changes in the electromagnetic radiation emanating from the monitored region.

As a result of this further development, the sensor operates contactlessly, thus functioning more reliably than mechanical switches. Advantageously, of course, for example, a single contactlessly operating sensor for detecting in an extensive region is far more economical than a plurality of mechanical foot contacts which react when a person enters the region accessible to the laser.

According to a preferred further embodiment of the invention, the at least one sensor is a sensor for detecting infrared radiation, preferably at wavelengths of between 700 nm and 14 $\mu$m, emanating from the monitored region. Using such sensors, it is possible for the non-visible radiation to be detected very readily. Above all, structural members for detecting in this wavelength range are commercially available, such that it is possible for the costs of the safety monitoring system to be reduced as a result of this further development.

In a preferred further development of the invention, the at least one sensor is a motion detector based on the pyroelectric principle. These detectors are used to detect the movements of an object. It is, accordingly, possible to distinguish between moving persons and still-standing objects, such that it is possible, for example when using a show laser with decorative objects, loudspeakers, monitors, musical instruments, and the like positioned on a stage, to ensure that the sensors detect only moving persons, and that other objects, which are required in the region accessible to the laser, do not result in an unintended switching-off of the show laser.

Other advantages are also provided by another preferred further development of the invention, in which at least one sensor is a thermopile sensor for contactless temperature measuring. By measuring the temperature, it is also possible to distinguish living persons from most inanimate objects in an enclosed space. In addition, in comparison to motion detectors, the thermopile sensor has the advantage that a contactless detection of temperature values will also include persons who are not in motion, but who may have been located within the danger region already prior to commencing the laser projection.

As mentioned above repeatedly, it is particularly advantageous when various partial regions of the laser-accessible region are monitored independently of one another. To this end, a preferred further embodiment of the invention provides that a plurality of direction-sensitive sensors be provided for monitoring, in each case, partial regions of the monitored region.

In this regard, it is possible for the enclosed space to be secured particularly well when, according to a preferred further development of the invention, said direction-sensitive sensors are arranged as a flat matrix. As a result of a corresponding subdivision into partial regions, a flat matrix for the sensors permits a particularly uniform arrangement so as to cover the entire region which is to be monitored. Moreover, in a matrix of direction-sensitive sensors, the overlapping is complete such that it is possible for an individual sensor in a matrix to pick up signals even in adjacent regions. This increases the safety aspect, since, in the event of a failure of one sensor, it is possible for the sensors adjacent thereto to assume the monitoring function.

Particularly simple in its structure is the further development of the invention in which it is intended to use a plurality of sensors, when these are light-sensitive elements of a CCD matrix, optical means being provided for producing the direction sensitivity and planarly depicting the objects in the monitored region on said CCD matrix. According to this further development, a particularly good local resolution is ensured. Since it is possible for only a single optical means to be provided for producing the direction sensitivity in respect of all the CCD matrix elements, the outlay remains low and reasonable, despite the plurality of sensors.

As a result of this further development, it is, in particular, possible for a plurality of regions of the enclosed space to be monitored separately, such that, for example when a person is within the monitored region, it is possible to blank only those partial regions of the laser in which the contour of the person is outlined. This means that, when a person accidentally penetrates into the laser projection region, it is merely a shadow image that is produced on the projection screen, similar to the analogous occurrence during cinematic projections, such that the enjoyment of the image display is only negligibly affected by the safety monitoring means.

In order to obtain image information, it is also possible to provide componentry, such as shift registers, control logics and scanner amplifiers. The image information obtained by means of such devices is then processed such that the projection beam does not expose the persons or objects to the laser beam and, instead, bypasses them with a corresponding deflection of the beam. Thus, it is not necessary for the projection beam to be switched off in order to protect persons or objects. It is possible for this feature to be used, primarily, for displaying vector graphics as commonly used in show business.

Advantages similar to those provided by contactless detecting by means of electromagnetic radiation are also provided by the contactless detecting of acoustic waves detected in the monitored region.

While it is possible for the above examples to operate passively, it is advisable, in particular in the example of the acoustic waves, that a transmitter is provided for directing acoustic waves into the monitored region. When the transmitter is designed appropriately, it is possible, for example by scanning with the wave produced, to obtain spatial information by means of a single transmitter. In addition, it is possible for the sensor to be tuned specifically to the transmitter, resulting in a considerably higher sensitivity due to a reduced background signal and, thus, resulting in more reliable monitoring. It is for this reason that, in a preferred further development of the invention, it is provided that at least one transmitter be provided for radiating electromagnetic and/or acoustic waves, which are harmless to human beings as far as frequency and intensity are concerned, into the monitored region, and at least one sensor for detecting these waves.

It is, in particular, possible for the transmitter to be designed to be direction-sensitive and for the waves to be directed, in each case, in the same direction as the projection laser, while the predetermined edge region is, of course, complied with, such that the person in the monitored region is detected in good time before the impinging of the laser light. The result hereof is the advantage that, with an appropriately large edge region, sufficient time is available for blanking or for switching off the laser light.

In this regard, too, it is not necessary for the projection laser to be switched off in order to protect persons or objects, instead blocking out their contours by means of an appropriately controlled movement of the deflecting means, or by blanking the laser while maintaining a safe distance.

Particularly suitable as a transmitter is a pilot laser radiating in the non-visible infrared wavelength range, in particular from 700 nm to a maximum of 1500 nm. By means thereof, it is possible to provide the advantages in a particularly good manner, primarily also using the above-mentioned CCD matrix which is sensitive in this wavelength range.

As mentioned above, it is advantageous when the radiation of the transmitter is guided in the laser beam, also taking into consideration an edge region. A particularly simple option is provided according to a further development in which the radiation of the pilot laser is superimposed on the laser beam for coaxial and/or divergent projection. In this regard, in particular, the non-visible light of the pilot laser is reflected by the projection screen and detected by the sensor. When the laser light of the pilot laser is blocked off by a person entering into the monitored space, the pilot laser light is altered such that it is possible for the sensor to switch the laser projection into the safe range.

In a preferred further development, a further alternative for providing an edge region resides in that a deflecting means is provided for the pilot laser beam, by means of which deflecting means it is possible to deflect the pilot laser beam across a larger area than the laser beam for the projection. It is, in particular, then possible for the pilot laser beam to be actuated independently of the laser beam. Consequently, it is advantageously also possible to screen the pilot laser beam far more rapidly, thereby making available correspondingly long time intervals for switching off the laser beam used for the projection.

In another advantageous further development of the invention, a filter for a wavelength of the pilot laser is connected upstream of the at least one sensor. As a result of this further development, the responsiveness of the sensor for the suppression of background signals in wavelengths other than those of the pilot laser is increased, such that an erroneous detection is substantially ruled out. With a corresponding increase in the sensitivity as a result of the filter, it is also possible to dispense with sensors for reference measurements to determine the background, which reduces the outlay in an advantageous manner.

According to another preferred further development of the invention, an optical means is provided for focussing the waves on to the sensor for detection. With the aid of the optical means, it is possible for the monitored region to be adjusted appropriately with regard to the directional dependency of the sensor. Although it is possible to produce a directional sensitivity by means of collimators, optical means, on the other hand, have the considerable advantage that it is possible for all the waves reaching the optical means to be collected on the sensor. As a result hereof, the sensitivity of said sensor is increased.

In another preferred further development of the invention, the transmitter is designed to be pulse-mode operated and, in particular, pulse amplitude-modulated, and a phase and pulse delay measurement, hereinafter referred to as delay measurement, is connected downstream of the at least one sensor, said delay measurement being designed to be interrogated regarding the distance between a detected object and the laser, for switching the image-generating means into different operating conditions during the delay. As a result of this delay measurement of the signal emitted by the transmitter and received by the sensor, it is also possible to obtain depth information. By means of this depth information, it is possible to provide different operating conditions for the projector, as a factor depending on the location of a laser disposed in the region covered by the laser. This is advantageous, in particular in view of the fact that the density by surface of the laser light is considerably lower in the vicinity of the projection screen than in the vicinity of the projector. This means that, when a person is detected in the vicinity of the projector, it may be necessary to switch off immediately, while a dimming of the laser light will be quite adequate when a person is detected in the vicinity of the projection screen. Instead of the switching-off provided, it is also possible for the arrangement to be controlled such that the intensity is attenuated continuously, as a factor depending on the depth information, such that the laser output is maintained below the danger region at every point of the monitored region in respect of a person disposed within said region.

According to a preferred further development, the transmitter is primarily advantageous when it is designed to be an LED. It is then possible to provide the pulsed modulation according to the preceding development in an extremely simple manner using a simple oscillator circuit.

It is possible for the reliability of all the above-mentioned safety devices to be increased when, according to another preferred further development of the invention, at least one sensor for presetting a set value, the signal of which is obtainable independently of the object in the monitored region, and a comparison circuit, by means of which the signal of the sensor detecting the monitored region is compared are provided. As a result of this further development, the susceptibility to failure is reduced. It is conceivable that a sensor, responding to temperature, will switch the apparatus into the person-safe state simply because the temperature in the room is simply too high, or scattered light, in a light-sensitive sensor, reflects a non-orderly function although there is no person in the monitored region. With the aid of a set value and a value comparison between the sensor signal and the set value, which is made possible by the additional sensor according to this further development, it is possible for such switching errors to be reduced or even prevented entirely.

The invention will be described in more detail hereinafter with reference to exemplified embodiments described in the drawings.

DESCRIPTION OF THE PREFERRED EMBODIMENT

It is possible for the safety device according to the invention to be used in all arrangements for displaying images by means of lasers. Image-generating means of this kind primarily also include show lasers, which are already widely used and by means of which vector graphics are displayed.

Figure 1:
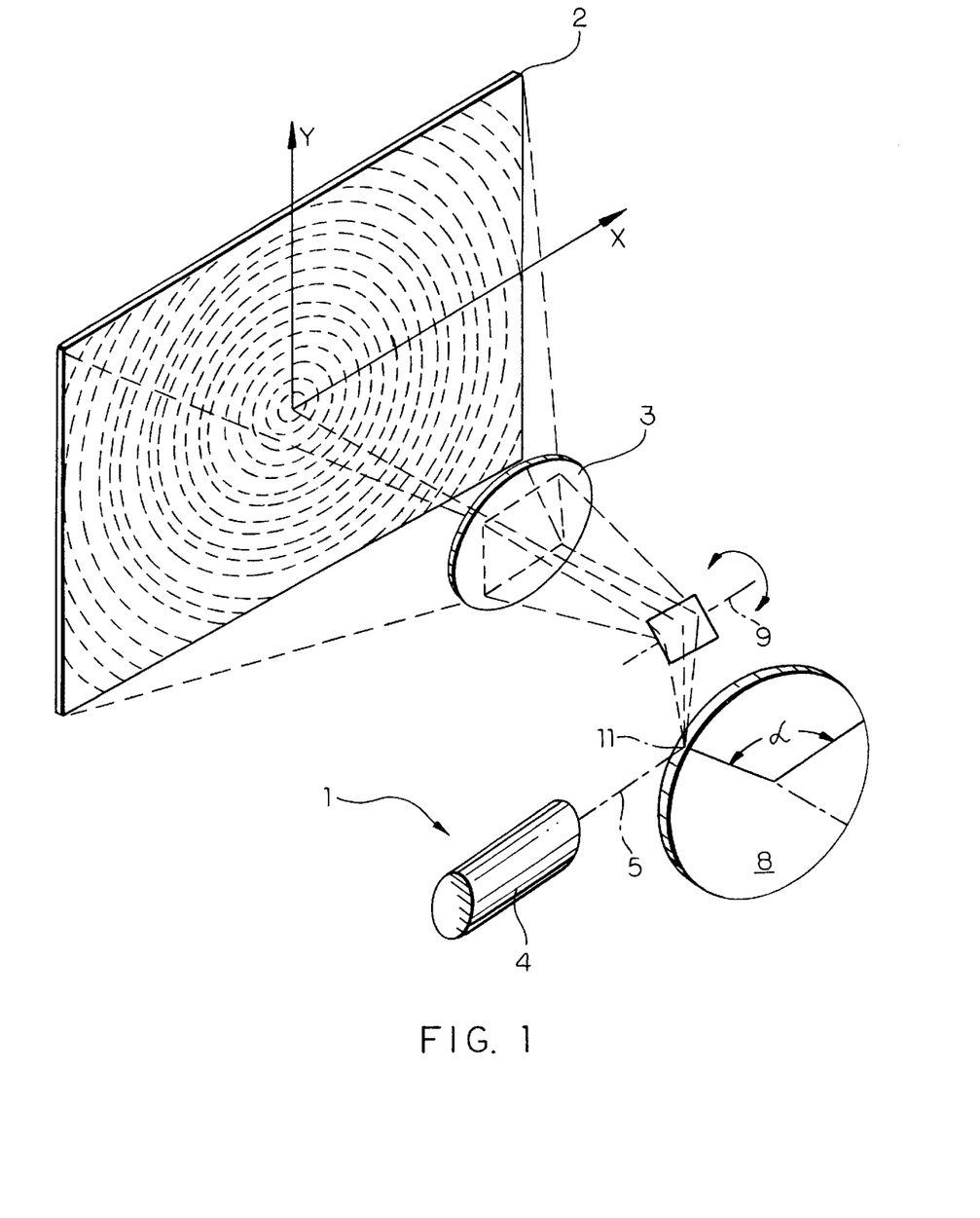
FIG. 1 shows an exemplified embodiment of an arrangement for displaying images.

A formerly relatively unknown example for the use of lasers for image generating is the display of television images by means of a rastered image display. An image-generating means 1 of this kind is diagrammatically illustrated in FIG. 1. In this regard, the image is produced on a screen 2, which enlarges the impinging laser beam and scatters it into a large spatial region, such that the image generated is visible to a large number of spectators. As in a cinema, the spectators in the exemplified embodiment of FIG. 1 are seated between the screen 2 and optical means 3 by means of which the image is projected. In this regard, mention should be made of the fact that the drawing of FIG. 1 is merely a diagrammatic illustration, i.e. in particular the dimensional relationships are not practically accurate.

The image on the screen 2 is produced by means of a laser 4 by a linear and pictorial rastering of a light beam 5 emitted by said laser. The light beam 5 is deflected by the polygonal surfaces 11 of a polygonal mirror 8 which directs the light beam 5 on a line in the x-direction on to the screen 2. In addition, a swivel mirror 9 is provided for deflection, and this deflects the light beam in the y-direction. The optical means 3 enlarges the deflection region such that it is possible for very large screens to be illuminated, even when the deflection angle of the mirrors 8 and 9 is relatively small.

In the image-generating means according to FIG. 1, an image is displayed by rastering, in a manner similar to television. In this regard, the laser 4 is controlled by a signal which modulates the intensity of the light beam 5 such that the respective image spot illuminated has the pictorially required brightness on the screen 2. The light beam 5 is uniformly rastered by the polygonal mirror 8 and the swivel mirror 9, and all the image spots of the image are sequentially illuminated on the screen 2. By way of analogy with conventional television comprising a Braun tube, the laser 4 replaces the electron gun or, in colour presentation, the electron guns, and the polygonal mirror 8 and the swivel mirrors 9 replace the known magnetic or electrostatic deflection of the electron beam.

It is possible for the spatial region between the optical means 3 and the screen 2 to be freely accessible during projection, as in a cinema, such that it is necessary for a person entering into this region to be protected against possibly high-power laser radiation.

Figure 2:
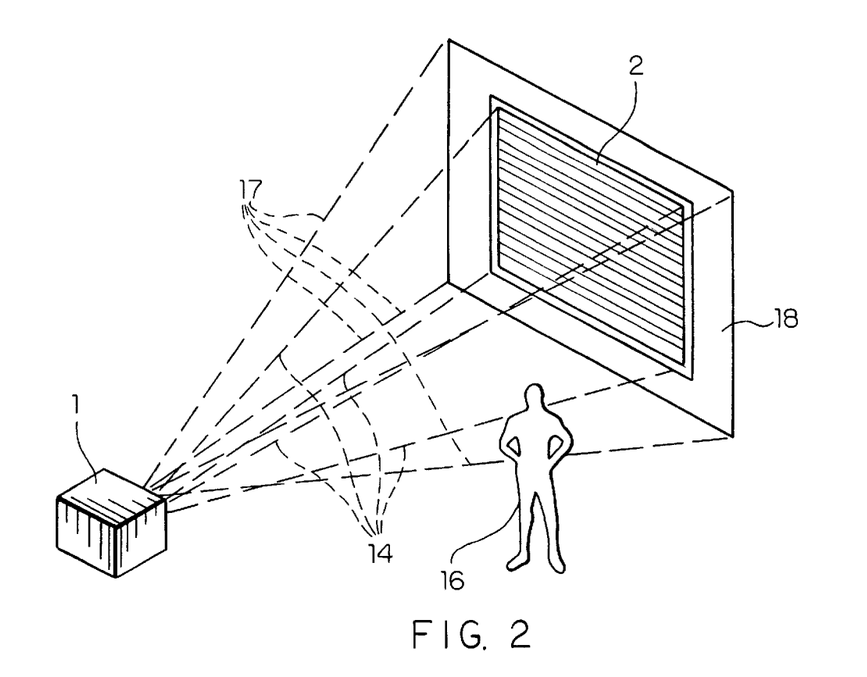
FIG. 2 is a basic diagram explaining the monitoring of a spatial region for preventing the laser according to the exemplified embodiment of FIG. 1 from causing any damage.

FIG. 2 once more diagrammatically shows the image-generating means 1 and the screen 2 described in more detail in FIG. 1. The light beam 5 emerges from the image-generating means 1, in particular the optical means 3 illustrated in FIG. 1, and is deflected across the entire angular spatial region 14. The light beam 5 comprises three individual beams, having the chrominance components red, green and blue, which are united to form a co-linear beam and are modulated, as described with reference to FIG. 1, with a video information.

FIG. 2 diagrammatically illustrates a spectator 16 who is able to view the laser image projected on to the screen 2. According to FIG. 2, said spectator is outside the laser-accessible region 14.

In cinematic projections, it is possible to use lasers 4 which are to be regarded as dangerous, from the performance-class point of view. For this reason, access by the spectator 16 to the laser-accessible region 14 must be prohibited in such instances. Nevertheless, it is generally possible for the spectator 16 to penetrate this danger region, and it is then necessary to provide protection against possible harm. In addition, merely to comply with standard specifications, it should be prevented that objects having highly reflective surfaces be arranged in the region 14 accessible to the laser beam when the laser is in use. Yet, glittering stage decor is typically present, in particular in show business. Reflecting objects are dangerous because they would also deflect light beams 5 out of the region 14 directly accessible to the laser. It is thus desirable for the presence of such objects also to be monitored by a laser safety device.

Figure 5:
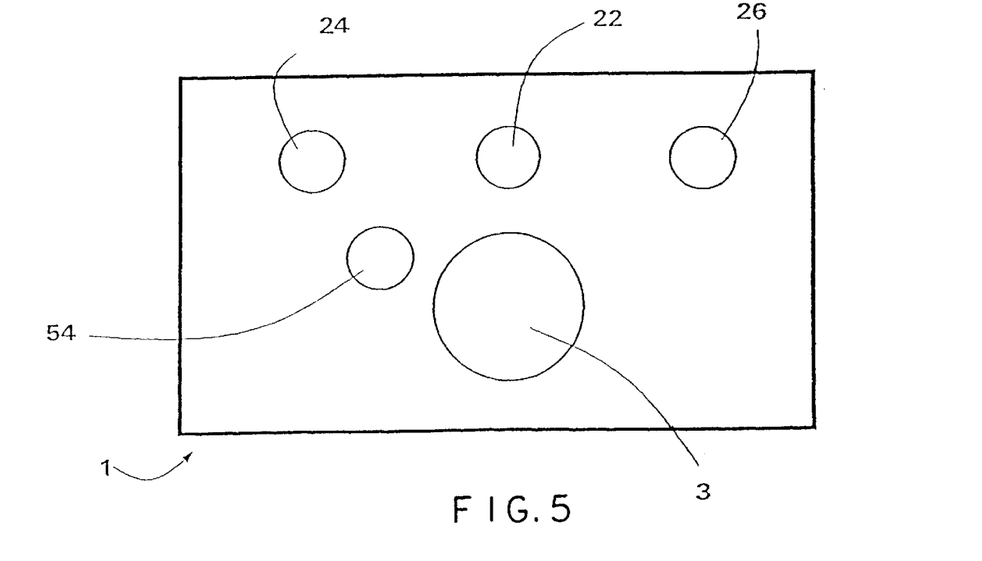
FIG. 5 shows the front view of a projector in an arrangement according to FIG. 1 and equipped with a safety device for lasers.

For a safety device, sensors 22, 24 and 26, as shown in FIG. 5, are arranged in the image-generating means 1 which shows the image-generating means 1 together with the optical means 3 as seen from the screen 2. Said sensors 22, 24 and 26 monitor a region 17 for the presence of objects or persons. The monitored region 17 has the size of that region 14 accessible to the laser and includes a monitored edge region 18. Said edge region 18, on the sides of the rectangular image, in each case is at least 10% of the extent of the image, i.e. the monitored region 17 is, in each case, at least 10% larger than the angular spatial region produced by the deflecting means and the optical means 3.

The dimensions of the edge region 18 are selected such that persons, such as the spectator 16, entering into the region 14 at a high speed will be recognized in good time by one of the sensors 22, 24 or 26, as a result of which the image-generating means 1 is switched into a second operating mode which is harmless to a spectator 16 disposed within the region 14 accessible to the laser. In the simplest case, said second operating mode may involve a switching-off of the laser 4. A more rapid protection is, however, achieved when the laser is blanked, because switching times of less than microseconds are required for the display of images under normal video standards.

When controlling the intensity of the light beam 5, it is, in particular, necessary to blank only a partial region in which the spectator 16 is disposed, such that the enjoyment of other spectators is not substantially affected. To this end, it is, however, essential that the region 17 be monitored by various sensors 22, 24, 26 in various partial regions. Respective examples will be described in more detail hereinafter.

Figure 3:
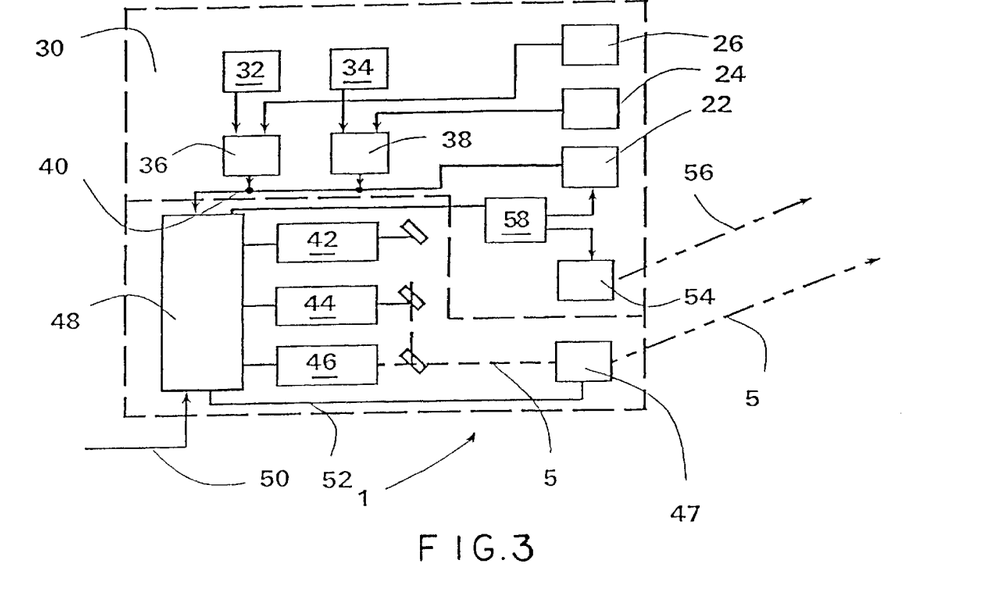
FIG. 3 is a basic illustration of the control of the arrangement of FIG. 1 with regard to the desired laser safety.

FIG. 3 shows, by way of example, the manner in which the image-generating means 1 should be controlled for effective protection.

In the illustration of FIG. 3, three sensors 22, 24, 26 are connected to the image-generating means 1 via a monitoring circuit 30. In the monitoring circuit 30, output signals of the sensors 24 and 26 with set value transducers 32 and 34 are compared via comparators 36 and 38. In the present exemplified embodiment, the sensors 24 and 26 are infrared-sensitive detectors from which the set value is produced via the set value transducers 32, 34 which are designed to be sensors. The sensors allocated to the set value transducers 32 and 34 are located outside the monitored region 17 (see FIG. 2) and are also not accessible to any spectators, such that, in principle, they determine the background infrared radiation in the enclosed space and preset a corresponding signal as the threshold value.

By contrast, the sensor 22 is used for actively monitoring the spatial region, as will be set out in more detail hereinafter. The signals of the sensor 22, 24 and 26 are OR-gated at the node 40, such that it is possible to influence the image-generating means 1 by each of the sensors.

The image-generating means 1 is provided with three lasers 42, 44, 46, the laser beams of which are combined to form a joint light beam 5 and are directed on to the screen 2 via a deflecting means 47 which comprises a polygonal mirror 8 and a swivel mirror 9. The light intensities of the lasers 42, 44, 46 are controlled by a controlling device 48, which is fed a video signal 50, by means of which the synchronization of the deflecting means 47 is also carried out via the line 52. In addition to the intensity modulation of the lasers 42, 44 and 46, the controlling device 48 also comprises the current supply for the lasers 42, 44, 46, such that, in the simplest case, the current supply to the lasers 42, 44, 46 is disconnected with the aid of the signal from the node 40, to safeguard against any dangers on the grounds of the light beam 5.

The exemplified embodiment illustrated in FIG. 3 does, however, provide for a further operating mode. To this end, a pilot laser 54 is provided for emitting a pilot laser beam 56. This pilot laser 54 is also rastered and scans the monitored region 17. The above-mentioned sensor 22 is tuned to the wavelength of the pilot laser 54 in that a λ-filter is connected upstream, such that it is sensitive essentially only to the wavelength of the pilot laser beam 56. For this reason, it is generally possible, in the case of the sensor 22, to dispense with a set-value comparison for suppressing interference signals, as for the sensors 24 and 26.

Rastering of the pilot laser 56 is synchronized by means of a control circuit 58. By means of the rastering pilot laser beam 56, it is possible to detect the precise position at which an interfering object or a spectator is located within the monitored region 17. The lasers 42, 44, 46 are then blanked only in those spatial regions in which the light beam 5, used for the projection, would impinge on the object. This blanking is carried out via the intensity control for the lasers 42, 44, 46, which intensity control is disposed within the controlling device and is capable of switching within 1/10 μs. An object or a spectator 16 will thus be perceived on the screen 2 merely in the form of a shadow image and has an only negligible effect on the pictorial experience of the remaining spectators and only in a small region of the display.

As a result of this safety device, it is advantageously possible for a projection to take place even when reflecting objects are erected in the region between the image-generating means 1 and the screen 2, as may be the case during shows. This is possible because these objects are also detected by the pilot laser beam 56, i.e. the control circuit prevents the light beam 5 used for the projection from impinging on such objects. Without adversely affecting the safety aspect, it is thus also possible for objects to be arranged between the image-generating means 1 and the screen 2, which gives the performer staging the show a greater degree of artistic freedom.

In another exemplified embodiment, which is not illustrated, the pilot laser 54 was replaced by an LED which was modulated and, in particular, pulse modulated. In addition, a delay measurement was provided in the controlling device 48, i.e. the pulses were evaluated with regard to the time which the light beam 56 required from the moment of leaving the light-emitting diode until it reached the sensor 22. This also provides a depth information regarding the objects. Instead of a complete switching-off, it is then possible for the lasers 42, 44, 46 to be blanked to a lower intensity, depending on the distance of the interfering object or a spectator 16 from the image-generating means 1. In the case of persons disposed in the vicinity of the screen 2, a lesser attenuation of the intensity of the lasers 42, 44, 46 was provided than in the case of persons who were disposed immediately in front of the image-generating means. In the case of very short distances from the image-generating means 1, the lasers 42, 44, 46 were also stopped via the controlling device 48, by switching off the power supply, so as to ensure total protection.

In a manner similar to the LED or the pilot laser 54, it is also possible to use acoustic waves, in particular in the ultrasonic range.

In that instance, the sensor 22 must be designed to be an acoustically sensitive element.

In principle, a single sensor 22 would suffice for ensuring safety when using the pilot laser 54, the corresponding light-emitting diode or a generator for acoustic waves. In the exemplified embodiment of FIG. 3, however, an additional degree of safety is provided by the circuitry comprising the sensors 24, 26 and the set value transducers 32, 34, which will switch off the lasers 42, 44, 46 in all instances when the signal detected by the sensors 24 and 26 and the results of the monitoring by the sensor 22 are not consistent.

The controlling device 48, via a corresponding switching, then assumes there to be a malfunction of the sensors or of the logic circuit linking said sensors. As a result hereof, an additional safeguard is provided, since the correct function of the sensors is also monitored.

As in the exemplified embodiment of FIG. 3, it is possible for a separate rastering means to be used for the pilot laser 54 or the pulsed light-emitting diode, for rastering the pilot laser beam. In a different exemplified embodiment, which is not illustrated, the light beam 56 was combined, via a mirror system, with the light beam 5 which is used for the projection, such that both are jointly deflected by the same deflecting means 47. As a result hereof, it is possible to dispense with an additional deflecting means. In addition, in this regard, the logic switching for blanking the light beam 5 is also relatively simple, since it is not necessary to provide any additional synchronizing switchings. This, because the pilot laser beam 56 is then guided in a spatial overlapping with the light beam 5, i.e. when impinging on a person, both light beams 5 and 56 are always in the same position, such that the blanking is reduced by a simple dimmer switch for the intensity signal of the lasers 42, 44, 46, as a factor depending on the signal received by the detector.

Figure 4:
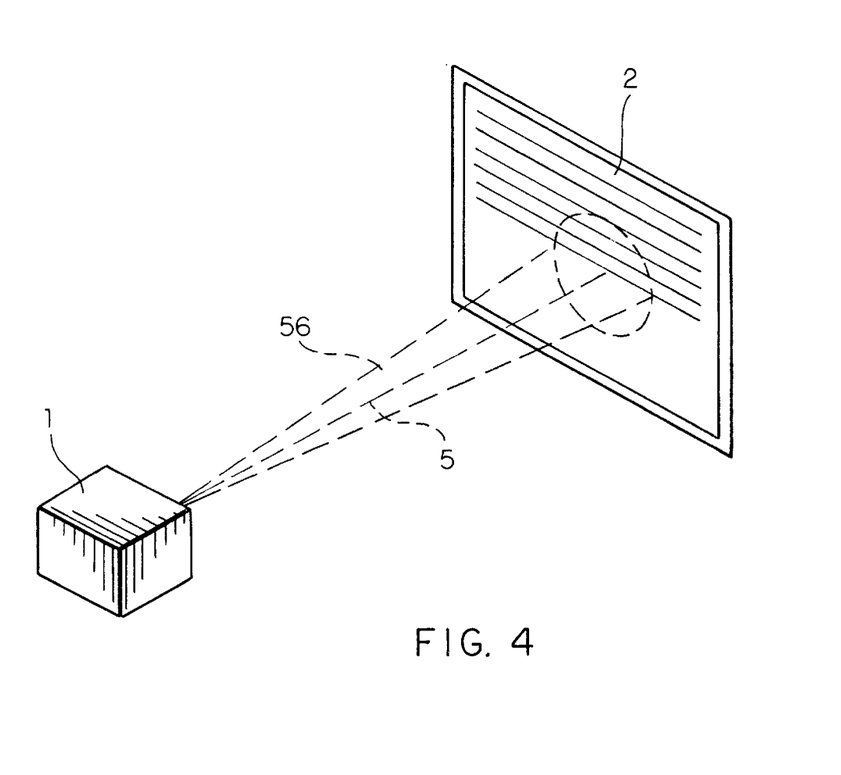
FIG. 4 is a basic illustration of a superimposition of a projection laser by a pilot laser used for safety monitoring.

In respect of the pilot laser beam 56, a particularly high parallelism is not required. Indeed, it is desirable that the pilot laser beam 56 be expanded beyond the projection laser beam 5, since the edge region 18 which is described above as being advantageous, is then also provided in the present exemplified embodiment. The approximate conditions for securing an edge region in this exemplified embodiment are illustrated in FIG. 4. This clearly shows that the light beam 5 used for the projection is concentric with the pilot laser beam 56. In addition, it can be seen that the pilot laser beam 56 is also expanded substantially, such that the desired edge region 18 is provided in a simple manner. The required expansion of the pilot laser beam is always provided, for example, when the above-described light-emitting diode is used instead of the laser 54.

In the exemplified embodiment of FIG. 4, the pilot laser beam 56 is superimposed coaxially and divergently on the projection laser beam 5. In practice, it is, however, possible to deviate from the coaxial arrangement, which simplifies, in particular, any adjusting operations. The crucial factor in this regard is that the light beam 5 impinges on the screen 2 in the vicinity of the centre of the pilot laser beam 56.

FIG. 5 shows the front view of the image-generating means 1 by way of example. The optical means 3, from which the projection light beam 5 emerges, is clearly shown. In addition, the sensors 22, 24 and 26 are clearly arranged in the vicinity of the optical means 3. This is particularly advantageous, since this makes it possible, in a simple manner, to meet the requirement that the region detected by the sensors 22, 24 and 26 should encompass practically the entire region 14 accessible to the laser.

Figure 6:
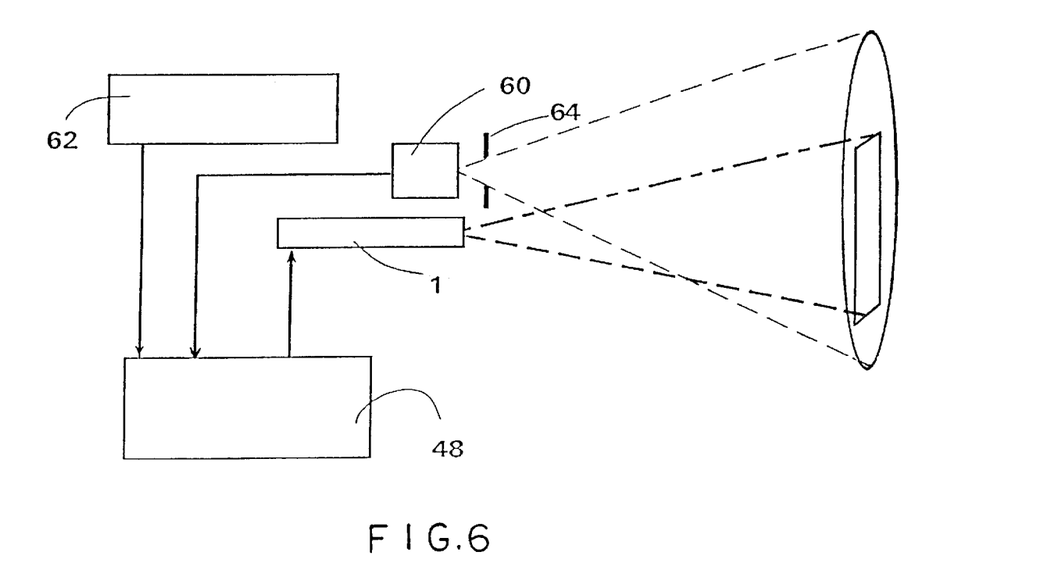
FIG. 6 shows monitoring of an enclosed space with the aid of a motion detector.

FIG. 6 shows a slightly different exemplified embodiment of the invention which, in addition to the above-described sensors 22, 24 for switching-off purposes, also comprises a motion detector 60. By means of this motion detector 60, it is possible for motionless objects to be distinguished from moving persons. In show business, this is also advantageous, since the safety switching is required to respond only to persons in the monitored region. It is possible to provide additional safety for non-moving persons by means of a thermopile sensor, which is switched similarly to the sensors 22 or 24.

In the example of FIG. 6, the motion detector 60 is connected to the controlling device 48 which, in a specific exemplified embodiment, however simply blocks the projection laser beam 5 by means of a shutter. The present exemplified embodiment also shows a key-operated switch 62, which permits a restoring of power to the device only under the supervision of trained personnel. In addition, a diaphragm 64 for detecting the monitored region of the enclosed space is provided.

Figure 7:
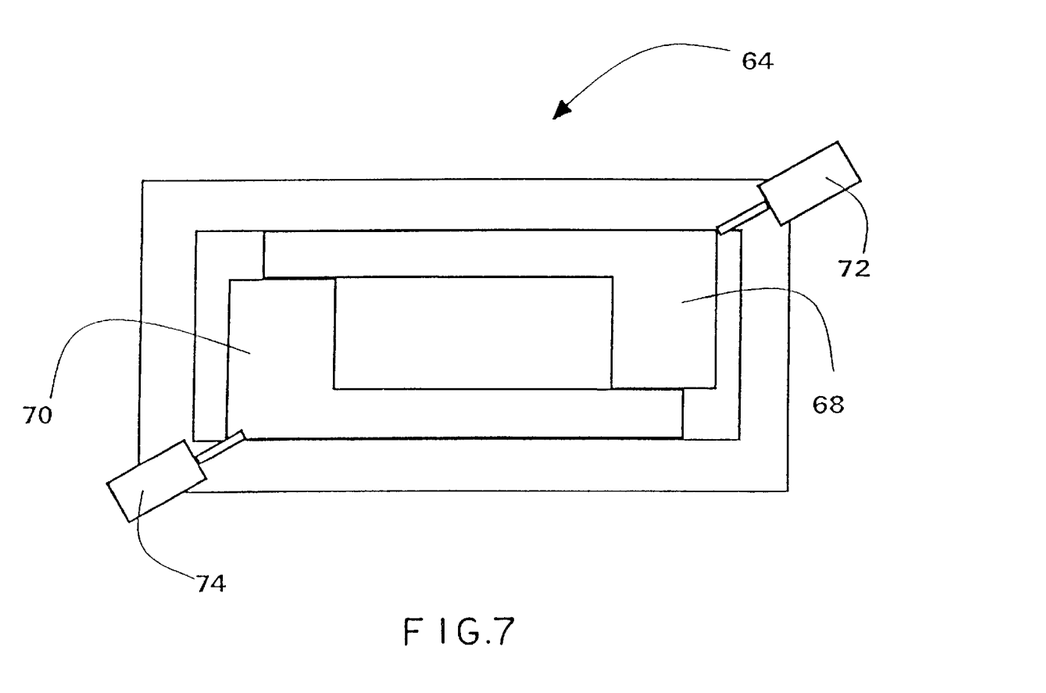
FIG. 7 shows an exemplified embodiment of a shutter for modifying the size of the monitoring region, as a factor depending on the size of the projected image.

A diaphragm of this kind is illustrated in FIG. 7, and this is designed, primarily, in an advantageous manner for an exemplified embodiment in which the optical means 3 is a variable system for changing image sizes. As mentioned above, it is advantageous in professional apparatus for the image size which is to be displayed to be variable. In order to change the monitored region, as a factor depending on the image size which is set in each case, two variable diaphragm parts 68 and 70 are provided in the diaphragm 64 of FIG. 7, and it is possible for said diaphragm parts to be in reciprocating motion due to the stepping motors 72 and 74, such that the monitored region is correlated to the image size to be displayed, depending on the required use. In the present exemplified embodiment, the stepping motors 72 and 74 are actuated dependent upon the variable optical means. The resultant sequence of automatic operations provided also increases safety, since maladjustments of the monitored region 17 relative to the region 14 accessible to the laser are prevented.

It is, in particular, provided in this exemplified embodiment that the stepping-motor control emits a signal by means of which the projection laser beam 5 is blanked until the correct size of the monitored region is adjusted via the stepping motors 72 and 74. As a result hereof, the danger-posing risks in respect of persons are also reduced.

Figure 8:
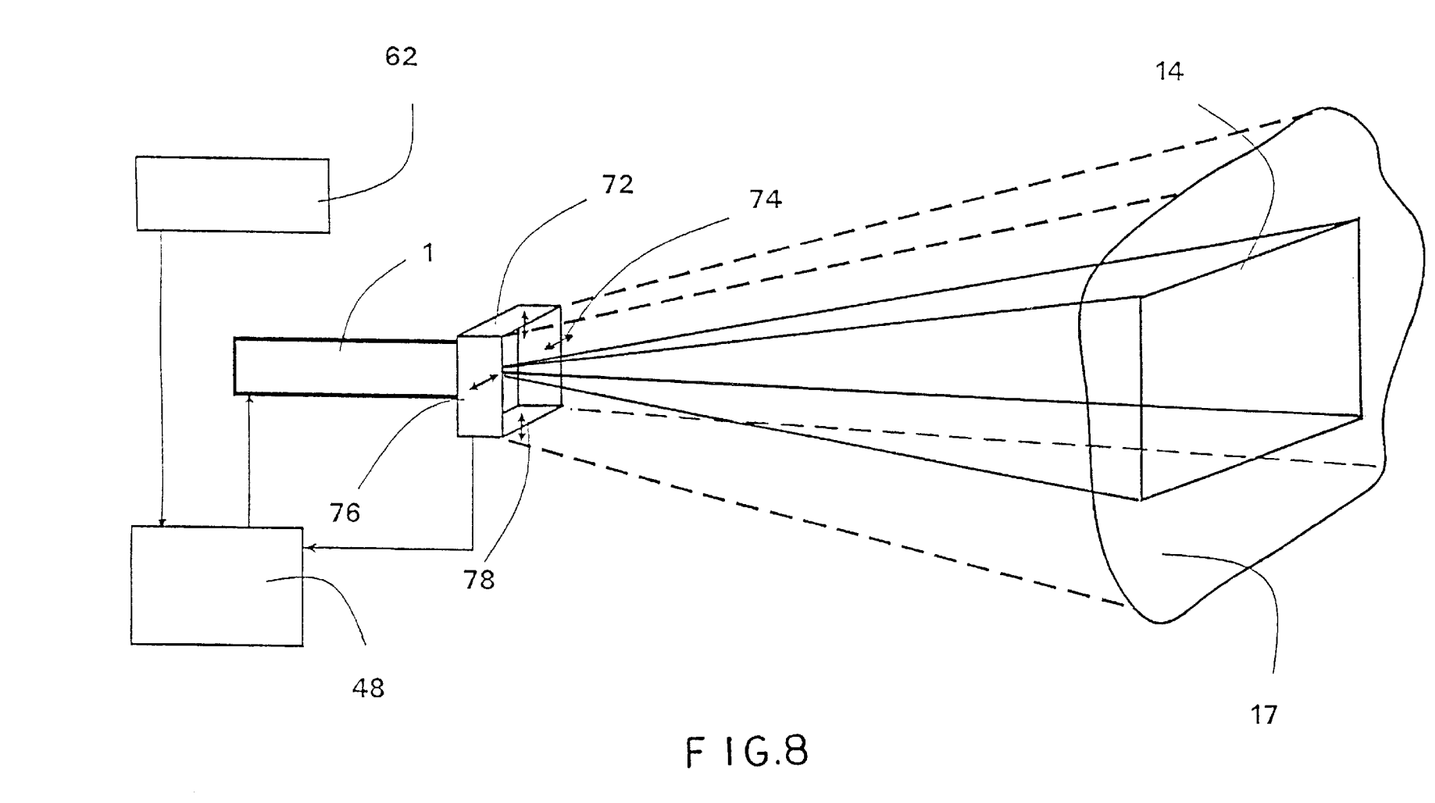
FIG. 8 shows curtain space monitoring by means of four motion detectors.

As can be seen in the diagrammatic illustration of FIG. 6, a small region in the vicinity of the laser projector 1 exists when the motion detector 60 is arranged slightly beyond the optical means 3 of the laser projector 1, in which small region monitoring is not possible. In order to eliminate sources of errors of this kind, motion detectors 72, 74, 76, 78 are provided in the exemplified embodiment according to FIG. 8, for four spatial planes, by means of which motion detectors it is possible to monitor movement in the edge regions of the region 14 accessible to the laser. In addition, FIG. 8 also again shows a key-operated switch 62, a controlling device 48 and the image-generating means 1, which all have the same functions as described in respect of the example in FIG. 6. The peripheral monitoring according to FIG. 8 utilizes the characteristic feature of motion detectors, namely that they are sensitive to movement essentially only in one spatial direction. The direction of motion sensitivity of the motion detectors 72, 74, 76 and 78 is diagrammatically illustrated by arrows.

Figure 9:
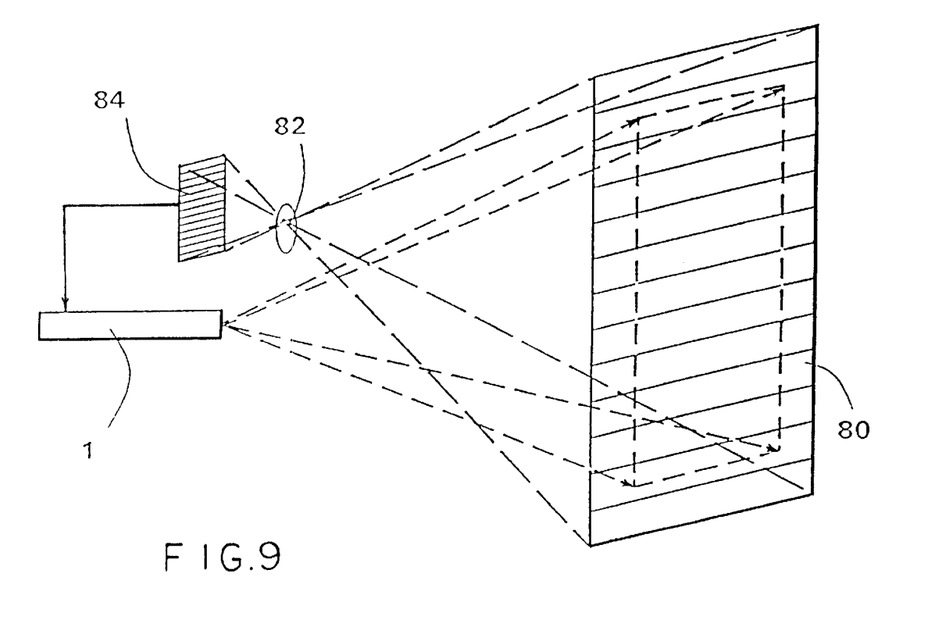
FIG. 9 shows an exemplified embodiment for safety monitoring by means of thermopile line sensors.

By way of example, FIG. 9 shows the full monitoring of the enclosed space by means of thermopile line sensors. In this regard, the space is monitored in partial regions subdivided into lines. By way of example, FIG. 9 then shows the resulting detection characteristic 80. In the present exemplified embodiment, an optical means 82 is used which images the monitored spatial region on to a line 84 of a pyrometer. This provides a linear position information for monitoring. The position information is used, after appropriate evaluation, to switch off the laser only in partial regions in which an object or a viewer 16 has penetrated into the region 14 accessible to the laser.

Figure 10:
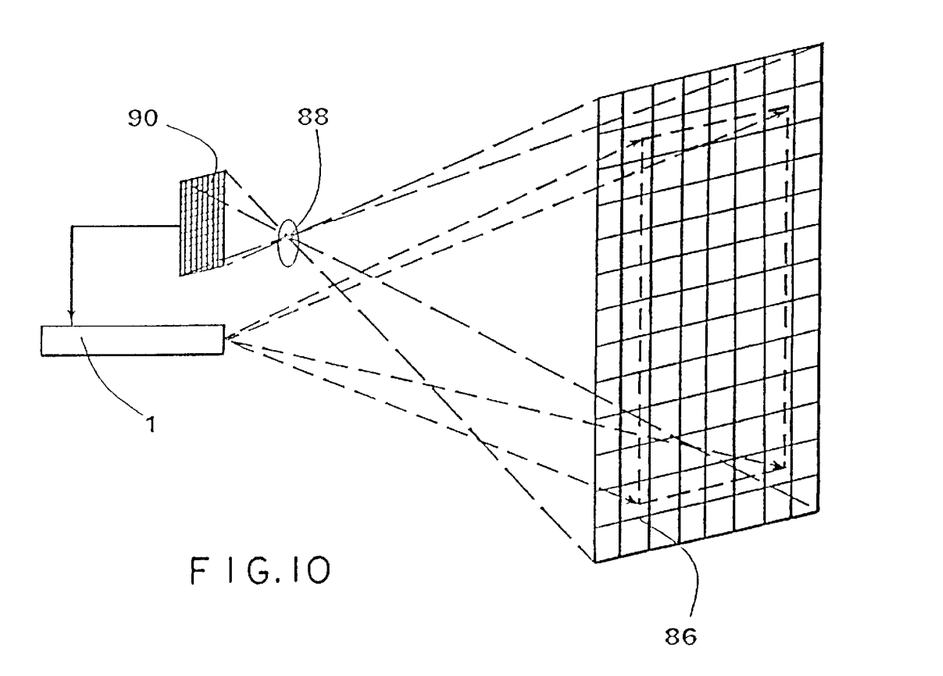
FIG. 10 shows complete space monitoring using a sensor matrix.

FIG. 10 shows a relatively improved exemplified embodiment, comprising a matrix-like detection characteristic 86. Said detection characteristic is, in this instance, provided by an optical means 88 which focusses the monitored region on to a sensor matrix 90. It is also possible for the sensor matrix 90 to be a pyrometric matrix or a plurality of thermopile sensors in a matrix arrangement. In particular for cost reasons, when there is a large number of matrix elements, CCD elements are also suitable and these are read, for evaluating the monitoring and for attenuating the light beam 5, in the same manner as in a television CCD camera, whereupon a corresponding switch blanks the light beam 5 only in the spatial regions in which an object or a viewer is detected by the sensor matrix 90.

Figure 11:
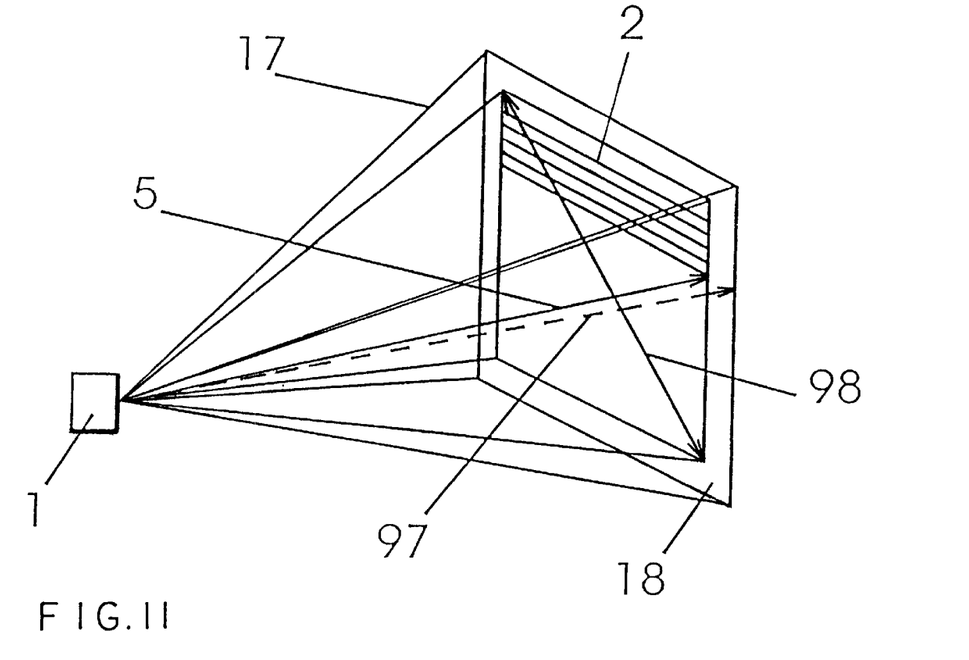
FIG. 11 shows a projection system including an infrared beam which has a larger screen region than the projection beam.

FIG. 11 shows an exemplified embodiment in which the safety monitoring is carried out by means of a pilot laser beam 97. Said pilot laser beam is also rastered, but the raster field is considerably larger than that of the laser used for image generating. As a result hereof, an edge region is also produced and this is provided to ensure a rapid switching-off of the laser via the safety device before an object or a person can penetrate into the projection region 14.

It is possible to achieve this by means of a separate deflecting means for the projection laser beam 97. In the exemplified embodiment, however, a different option was selected. In this instance, the laser beam 5 for displaying the image and the projection laser beam 97 are rastered by the same deflecting means 47. In this regard, the raster region of the deflecting means 47 was, however, enlarged relative to the region required for the image display. On the other hand, the laser beam 5 for the projection is blanked during the entire duration of the sweeping of the edge region 18. As a result, an edge region which is rastered only by the pilot laser beam 97 is produced.

Instead of providing an enlargement of the deflecting region, it is possible, when reading the image from an image storage, for the image size to be reduced, also with regard to the screen diagonal 98, as a result of which an edge region 18 is also established for imaging and this is not used for image-displaying.

Figure 12:
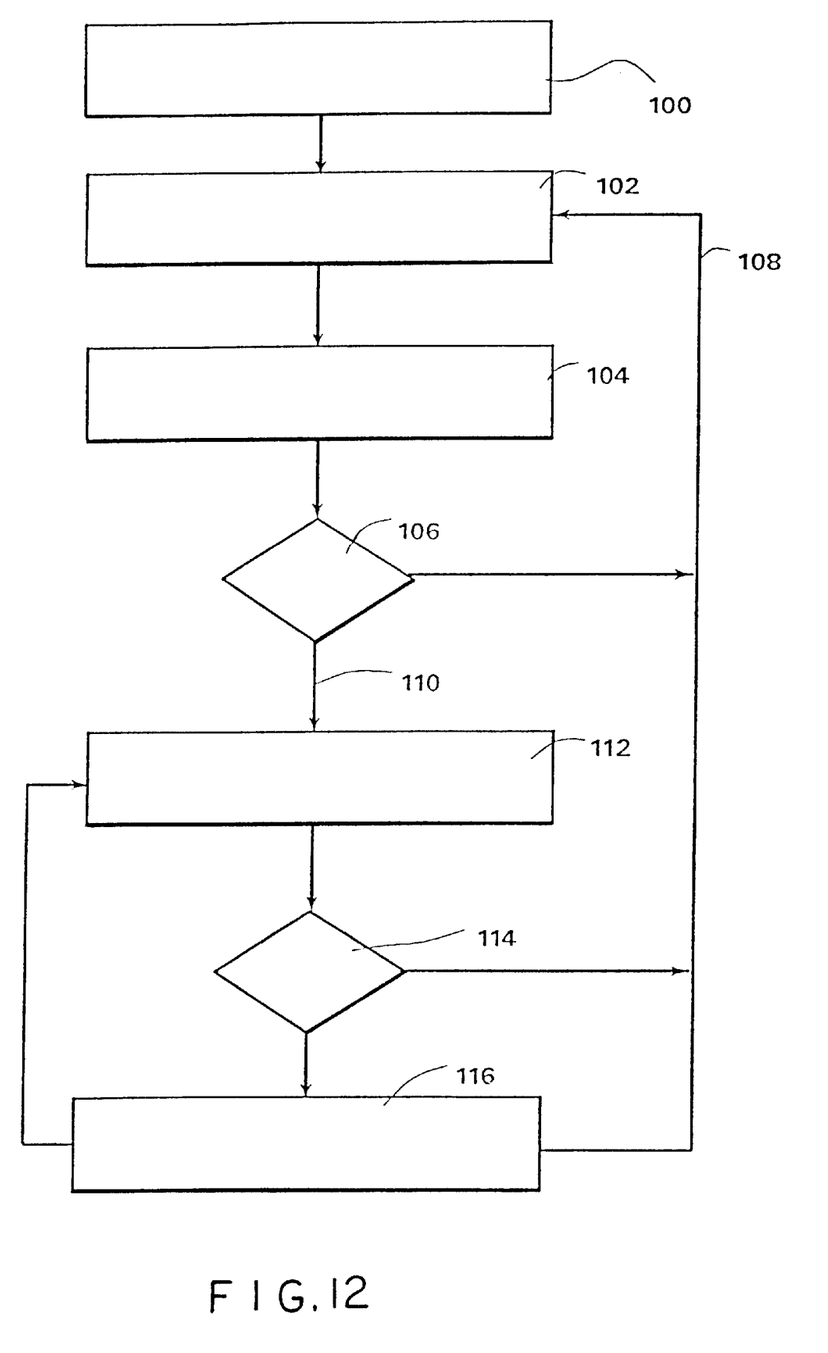
FIG. 12 shows a flow chart of an active laser safety device.

FIG. 12 shows a flow chart of an active laser safety device which is provided, in particular, for domestic use. The step 100 shown in FIG. 12 denotes switching-on of the laser projector with blanked laser light. In step 102, which, from a control point of view is repeated continuously, the modulators of the laser beam are also blanked, and a pilot laser beam is directed into the projection space. In this regard, the projection laser beam 97 is pulse modulated and a delay measurement is provided. For evaluating the delay measurement when the laser beam for displaying the image is switched off, the time delay over the phase position of the detected and reflected pilot laser beam 97 is recorded and evaluated. If it is established, during the evaluation of the time delay, that an object is present in the projection region, the control switches back to the step 102 via the path 108, until no object is detected within the safety region.

In the absence of any object in the safety region, the control switches to step 112, via the path 110, in which step the modulators for the lasers are switched to modulation for image-displaying. This means that the lasers are no longer blanked and the images are displayed. At the same time, the phase continues to be monitored in step 112. It is provided, in particular, that the local phase positions are also stored in step 104, such that it is possible for the respective phase detected in step 112 to be compared with the stored phase. As a result of this procedure, it is possible to provide a high degree of flexibility with regard to the spacing of the screen from the image-generating means 1. When interrogating on the basis of a fixed phase position, a change of the spacing of the screen would not be possible, since the signals in the sensor would then be identical to the signal of an object in the safety area.

In step 114, the phase position is again interrogated as to whether an object has been detected. If an object has been detected, the control, via the step 108, switches back to step 102 in which the modulators are switched off and the laser beam 5 is blanked. If no object is detected, the phase of the pilot laser beam is again measured in step 116 and examined again in step 112 as to the detection of an object in the safety area.

Figure 13:
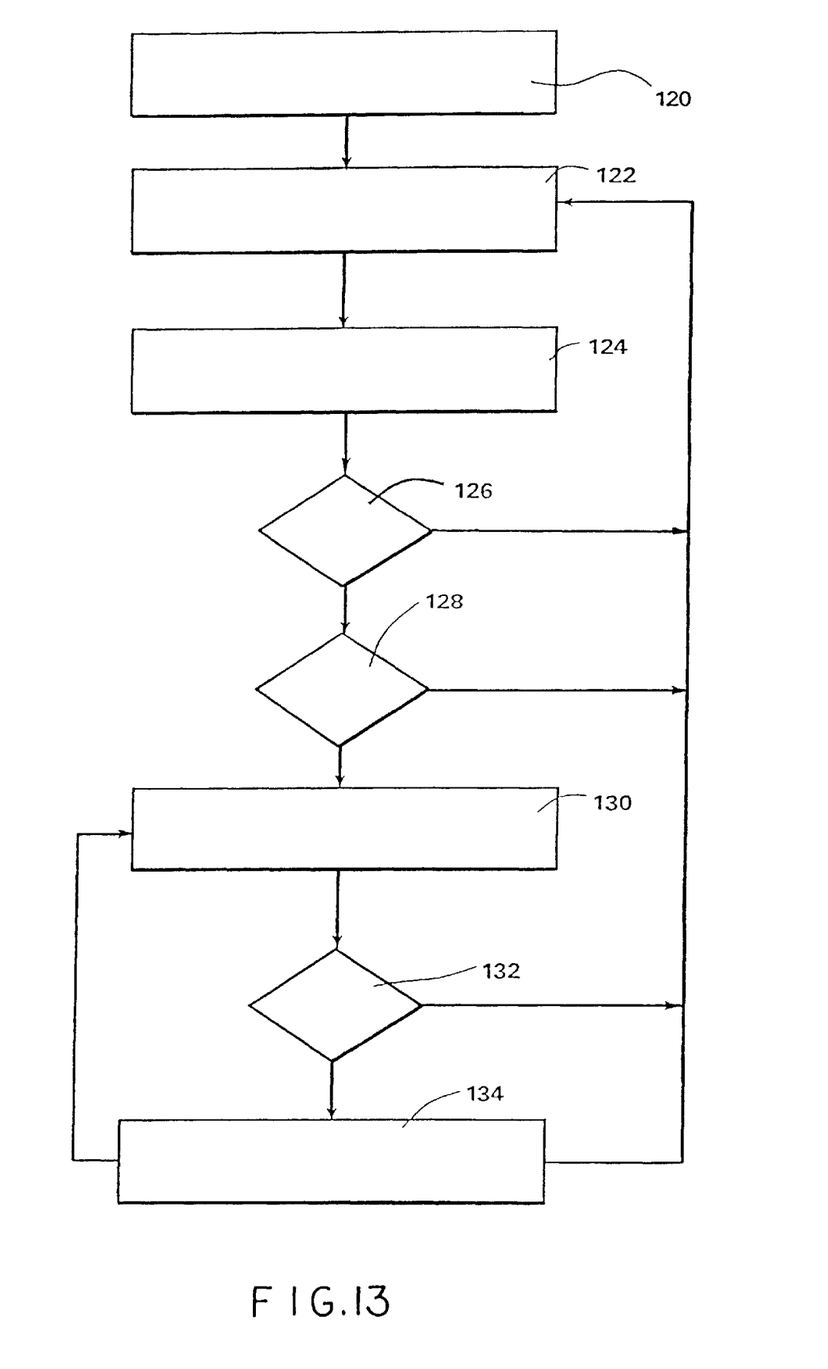
FIG. 13 shows a flow chart of a combined passive laser safety device.

FIG. 13 shows a flow chart of a combined passive laser safety device which is provided, in particular, for professional use. The sequence of the safety programme is carried out by a combination of two sensors, i.e. a pyroelectric sensor and a thermopile sensor.

In this regard, step 120 again involves switching-on the laser projector, and step 122 the switching-off of the modulators, in order to blank the laser beam 5 for displaying the image. By contrast to the example of FIG. 12, a learning phase is provided in step 124, for measuring the temperature in the projection space and for tuning the pyroelectric motion detectors. In this regard, in step 126, the control switches back to step 122 if a movement was detected, such that the so-called learning phase recommences in step 124 with the switched-off laser beam 5. In the other case, an interrogation is carried out, via the step 128, for an increased room temperature. If the room temperature is elevated during the measuring process, the control also switches back to step 122, such that the learning phase in step 124 recommences with switched-off laser beam 5. If the room temperature has remained constant, the control then measures reference values for the room temperature, for comparing with sensor signals. In this regard, movements are detected via the pyroelectric sensor. In the absence of a motion signal, the control switches to step 130 in which the modulators are switched on for modulation of the laser beam 5. This means, that image-displaying can now commence. If the motion detector detects a movement in the safety area during step 132, the control is returned to step 122. This means that the modulators are switched off, and the motion detectors and the room temperature are newly determined in step 124 under supervision of the personnel, for measuring the temperature in the projection space. Otherwise, the room temperature is measured in step 134, and the pyroelectric sensor for detecting movement is adapted to the current room temperature. The control then again switches to step 130, whereupon the motion detector is again interrogated in step 132, etc.

The above exemplified embodiments show the wide range of possibilities for providing a safety device of the aforementioned kind. In particular, various means have been shown for ensuring the greatest possible degree of safety by additional circuitry, in particular, also of additional sensors. The monitoring in partial regions is, in particular, particularly advantageous in the practical sphere for television projections, since persons entering the safety area are visible on the projection screen only in the form of a shadow image. The pictorial effect is thus not substantially affected.

While the foregoing description and drawings represent the present invention, it will be obvious to those skilled in the art that various changes may be made therein without departing from the true spirit and scope of the present invention.

What is claimed is:

1. An arrangement for displaying images on a projection screen comprising:

a laser which emits a laser beam;

deflecting means for deflecting the laser beam;

image-generating means connected to a controlling device for controlling said laser and said deflecting means;

said image-generating means being switchable in two operating modes, the first operating mode being the standard operating mode for projecting, and the second being an operating mode in which the laser radiation is harmless to a person disposed in the region to which the laser has access; and a safety circuit being provided and comprising at least one sensor by which a monitored region, which is larger than the region accessible to the laser, between said image-generating means and the projection screen is monitored as to the presence of objects, wherein the image-generating means is switchable into the second operating mode by said safety circuit, in the event of an object being present.

2. The arrangement according to claim 1, wherein the monitored region comprises the region which is accessible to the laser and an edge region which is provided for the timeous detection of objects which are moving toward the danger zone.

3. The arrangement according to claim 2, wherein the edge region is greater than 10% in each deflection predetermined by the deflecting means for the laser light beam.

4. The arrangement according to claim 1, wherein at least one sensor is a sensor for detecting changes in the electromagnetic radiation emanating from the monitored region.

5. The arrangement according to claim 1, wherein at least one sensor is a sensor for detecting heat radiation emanating from the monitored region.

6. The arrangement according to claim 5, wherein the heat radiation is in the wavelengths between 700 nm and 14 µm.

7. The arrangement according to claim 1, wherein at least one sensor is a motion detector based on the pyroelectric principle.

8. The arrangement according to claim 1, wherein at least one sensor is a thermopile sensor for contactless temperature measuring.

9. The arrangement according to claim 1, wherein a plurality of direction-sensitive sensors are provided for monitoring, in each case, partial regions of the monitored region.

10. The arrangement according to claim 9, wherein the direction-sensitive sensors are arranged as a flat matrix.

11. The arrangement according to claim 10, wherein the sensors are light-sensitive elements of a CCD matrix, an optical means which provides a planar projection of objects in the monitored region on said CCD-matrix, being provided for producing the direction sensitivity.

12. The arrangement according to claim 1, wherein at least one of the sensors is designed to detect acoustic waves emanating from the monitored region.

13. The arrangement according to claim 1, wherein at least one transmitter is provided for radiating at least one of electromagnetic and acoustic waves, the frequency and intensity of which are harmless to persons into the monitored region, and at least one sensor is provided for detecting these waves.

14. The arrangement according to claim 13, wherein a pilot laser radiating in the non-visible infrared wavelength range from 700 nm to a maximum of 14 µm is provided as the transmitter.

15. The arrangement according to claim 14, wherein the radiation of the pilot laser is superimposed, coaxially and/or divergently, upon the laser beam for projection.

16. The arrangement according to claim 14, wherein the pilot laser beam is adapted to be rastered, by means of a deflecting means, across a deflecting region which is greater than that for the image display.

17. The arrangement according to claim 14, wherein a filter for a wavelength of the pilot laser is connected upstream of the at least one sensor.

18. The arrangement according to claim 13, wherein an optical means is provided for focussing the waves on the sensor for detecting.

19. The arrangement according to claim 13, wherein the transistor is designed to be pulse-mode operated and a time delay measurement for the wave is connected downstream of the at least one sensor, said delay measurement being designed to be interrogated regarding the distance between a detected object and the laser for switching the image-generating means into different operating conditions during the time delay.

20. The arrangement according to claim 13, wherein the transmitter is an LED.

21. The arrangement according to claim 1, wherein at least one sensor for presetting a set value, the signal of which is obtainable independently of objects in the monitored region, and a comparison circuit, by which the signal of the sensor detecting the monitored region is comparable, are provided.

* * * * *